US006480756B1

(12) United States Patent
Luh et al.

(10) Patent No.: US 6,480,756 B1
(45) Date of Patent: Nov. 12, 2002

(54) REAL-TIME MONITOR MECHANISM FOR HETEROGENEOUS PRODUCTION LINES

(75) Inventors: Hwei-Tsu Ann Luh, Hsinchu (TW); Lieh-Chang Tai, Hsinchu (TW); Hsin-Ming Hong, Chang Hua Hsien (TW); Bin-Hong Lin, Hsin Tien (TW); Min-Huey Tsai, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 09/415,230

(22) Filed: Oct. 12, 1999

(51) Int. Cl.[7] .............................................. G06F 19/00
(52) U.S. Cl. ........................ 700/108; 700/100; 700/121
(58) Field of Search ................................ 700/100, 101, 700/108, 111, 121, 102

(56) References Cited

U.S. PATENT DOCUMENTS

| | | | | | |
|---|---|---|---|---|---|
| 5,523,952 | A | * | 6/1996 | Inada ........................... | 700/100 |
| 5,546,326 | A | * | 8/1996 | Tai et al. ....................... | 700/99 |
| 5,818,716 | A | * | 10/1998 | Chin et al. .................... | 700/100 |
| 6,122,621 | A | * | 9/2000 | Shimada ....................... | 700/101 |
| 6,230,068 | B1 | * | 5/2001 | Wu et al. ....................... | 379/14 |
| 6,289,368 | B1 | * | 9/2001 | Dentler et al. ................ | 709/101 |
| 6,343,238 | B1 | * | 1/2002 | Kudo .......................... | 700/106 |
| 6,353,769 | B1 | * | 3/2002 | Lin .............................. | 700/101 |

* cited by examiner

Primary Examiner—Maria N. Von Buhr
Assistant Examiner—Elliot Frank
(74) Attorney, Agent, or Firm—Nath & Associates, PLLC; Harold L. Novick

(57) ABSTRACT

A method for monitoring the real-time production operation is disclosed. The used stage time, the used waiting time, and the theoretical remaining processing time is counted. The allowed stage time, the allowed waiting time, and the allowed slack time is also estimated. The critical stage ratio, the critical waiting ratio, and the critical slack ratio are then calculated by the following equations: critical stage ratio= allowed stage time/used stage time; critical slack ratio= allowed slack time/theoretical remaining processing time; critical waiting ratio=allowed waiting time/used waiting time. Thereafter, the status of the lot in a stage is graded according to its critical ratio of stage, slack, and waiting. Color codes are used to indicate the critical degrees. A stage critical degree report including the WIPs and the color codes is tabled to display all the statuses of the stage.

17 Claims, 3 Drawing Sheets

| Product | lot id | Stage 1 | Stage 2 | Stage 3 | Stage 4 | WIP |
|---|---|---|---|---|---|---|
| Product A | lot A1 | | | | 24 | 48 |
| | lot A2 | 24 | | | | |
| Product B | lot B1 | | | 22 | | 22 |
| Product C | lot C1 | | 16 | | | 16 |
| Product D | lot D1 | | | | 20 | 38 |
| | lot D2 | 18 | | | | |
| Product E | lot E1 | | | | 12 | 36 |
| | lot E2 | | | 12 | | |
| | lot E3 | 12 | | | | |

Symbol 1    Symbol 2    Symbol 3    Symbol 4    Symbol 5

| Product | lot | Stage 1 | Stage 2 | Stage 3 | Stage 4 | WIP |
|---|---|---|---|---|---|---|
| Product A | lot A1 | | | 24 | | 48 |
| | lot A2 | 24 | | | | |
| Product B | lot B1 | | | 22 | | 22 |
| Product C | lot C1 | | 16 | | | 16 |
| Product D | lot D1 | | | | 20 | 38 |
| | lot D2 | 18 | | | | |
| Product E | lot E1 | | | | 12 | 36 |
| | lot E2 | | | 12 | | |
| | lot E3 | | 12 | | | |

FIG.1(Prior Art)

| Product | lot | Stage 1 | Stage 2 | Stage 3 | Stage 4 | Due date |
|---|---|---|---|---|---|---|
| Product A | lot A1 | | | 14 hrs. | | 99.9.16 |
| | lot A2 | 1 hrs. | | | | 99.9.20 |
| Product B | lot B1 | | | 12 hrs. | | 99.9.6 |
| Product C | lot C1 | | 5 hrs. | | | 99.9.5 |
| Product D | lot D1 | | | | 7 hrs. | 99.9.10 |
| | lot D2 | 2.1 hrs. | | | | 99.9.13 |
| Product E | lot E1 | | | | 4 hrs. | 99.9.14 |
| | lot E2 | | | 2 hrs. | | 99.9.16 |
| | lot E3 | | 9.5 hrs. | | | 99.9.18 |

FIG.2(Prior Art)

| Product | lot id | Stage 1 | Stage 2 | Stage 3 | Stage 4 | WIP |
|---|---|---|---|---|---|---|
| Product A | lot A1 | | | 24 | | 48 |
| | lot A2 | 24 | | | | |
| Product B | lot B1 | | | 22 | | 22 |
| Product C | lot C1 | | 16 | | | 16 |
| Product D | lot D1 | | | | 20 | 38 |
| | lot D2 | 18 | | | | |
| Product E | lot E1 | | | | 12 | 36 |
| | lot E2 | | | 12 | | |
| | lot E3 | | 12 | | | |

Symbol 1   Symbol 2   Symbol 3   Symbol 4   Symbol 5

REAL-TIME MONITOR MECHANISM FOR HETEROGENEOUS PRODUCTION LINES

FIELD OF THE INVENTION

The present invention relates to the process control of a heterogeneous production line, for example, of semiconductor manufacturing. More especially, the present invention relates to a mechanism for monitoring the real-time operation performance of a heterogeneous production line.

BACKGROUND OF THE INVENTION

In a semiconductor fabrication factory, there are sometimes various productions and various processes managed and controlled in a production line at the same time, especially for those productions to order. Short cycle times and precise delivery schedules are always pursued as major goals and tasks for the purpose to satisfy the expectations of customer. For attaining a greater throughput and providing completion of the lot before the due date (DD) with short cycle time, complex sets of product mix and process mix are usually arranged to optimize delivery efficiency. In a heterogeneous production arrangement as mentioned above, various products processed simultaneously in a production line are often dispatched to a test process.

In such a heterogeneous production line with mixed-product operation, different products will be processed over different process stages with different stage time even in the same stage. In order for foundry supervisors to dispatch lots more effectively and provide a better operation arrangement of product and process mixes, a foundry fabrication operation must be sketched with some characteristics that can present the information needed.

In the past, work in process (WIP) is often listed to display the wafer numbers of those lots in every stage of a production line, and a clock time is usually adopted to indicate the actual amount of time that has already been consumed for the lot in a stage. However, the information that can be provided by WIP and the clock time is limited. Supervisors must utilize this WIP and clock time with their experience to get further information about the conditions of the productions. Sometimes, it could even provide a misleading message for reporting the operation efficiency. The same clock time represents the different meaning for productions having different cycle time. For example, a same clock time of about two hours may be not enough for a process requiring three-hour cycle time, but will be too much for a process only requiring one-hour cycle time.

FIG. 1 displays a stage WIP report of a four-stage production line, wherein every row represents the WIPs of a lot, and every column represents the WIPs of a stage. In this report, only the wafer numbers are shown and no other status such as clock times can be found. FIG. 2 displays a stage clock time report of the same production line. The amounts of the clock time of all lots at all stages are shown, but the clock time tells not much without comparison to the ideal cycle time, because it neglect the variance between the ideal cycle time needed for different products. It needs an experienced supervisor to concentrate himself to comprehend what a clock time list, such as the one shown in FIG. 2, tells.

Even an experienced supervisor can not be aware from the WIP and clock time reports that, does the current process fall behind the scheduled progress in consideration of all the processes as a whole rather than the individual process. There is a possibility that, although the current process achieves percentage of scheduled progress, the remaining time is inadequate for completing all the subsequent processes before the due date. It could also be possible that although the current process falls behind the scheduled progress, the remaining time is still ample for completing all the subsequent processes before the due date.

Hence, there is no sufficient information can be found in the present monitoring mechanism for the supervisor to judge in the real time that, is the remaining time till the due date sufficient, or insufficient, for the subsequent processes. Most of the issues arising in the processes will not come into awareness until post analysis, which can not help to reduce the cycle time while in process. A real-time monitoring mechanism is still lacked, or at least not good enough, in the present system.

SUMMARY OF THE INVENTION

The present invention proposes a method for monitoring the real-time production operation. This method utilizes critical ratios for characterizing the production statuses and indicating the critical degrees of lots at different stages. Color codes are applied to denote the critical degrees.

The used stage time of a lot already used at a stage, or the used waiting time already used to waiting in the stage, and the theoretical remaining processing time anticipated to be used for all the remaining processes, is counted. The allowed stage time anticipated for the lot to be expended at the stage, or the allowed waiting time allowed to wait at the stage, and the allowed slack time from the present until the target-out time, is estimated. The target-out time is the time scheduled to complete all the processes for the lot. The critical stage ratio, or the critical waiting ratio, and the critical slack ratio are calculated by the following equations:

critical stage ratio=allowed stage time/used stage time, critical slack ratio=allowed slack time/theoretical remaining processing time, critical waiting ratio=allowed waiting time/used waiting time.

Thereafter, the status of the lot in a stage is graded according to its critical stage ratio, critical slack ratio, and critical waiting ratio. Color codes are used to denote the critical degrees for different ranges of critical ratios. A stage critical degree report of a heterogeneous production line is tabled to display all the statuses of the stage in this production line. The WIPs, color codes of the critical stage ratio, the critical slack ratio and the critical waiting ratio are all displayed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a stage WIP report of a four-stage production line according to the prior art;

FIG. 2 is a stage clock time report of the same production line shown in FIG. 1;

DESCRIPTION OF THE PREFERRED EMBODIMENT

The present invention proposes a novel method for monitoring the real-time production operation. This method utilizes critical ratios of stage, waiting and slack for characterizing the production statuses and indicating the critical degrees of lots at the different stages in a production line. Further, color codes are applied to denote the characteristics of the critical degrees.

Figure 3:
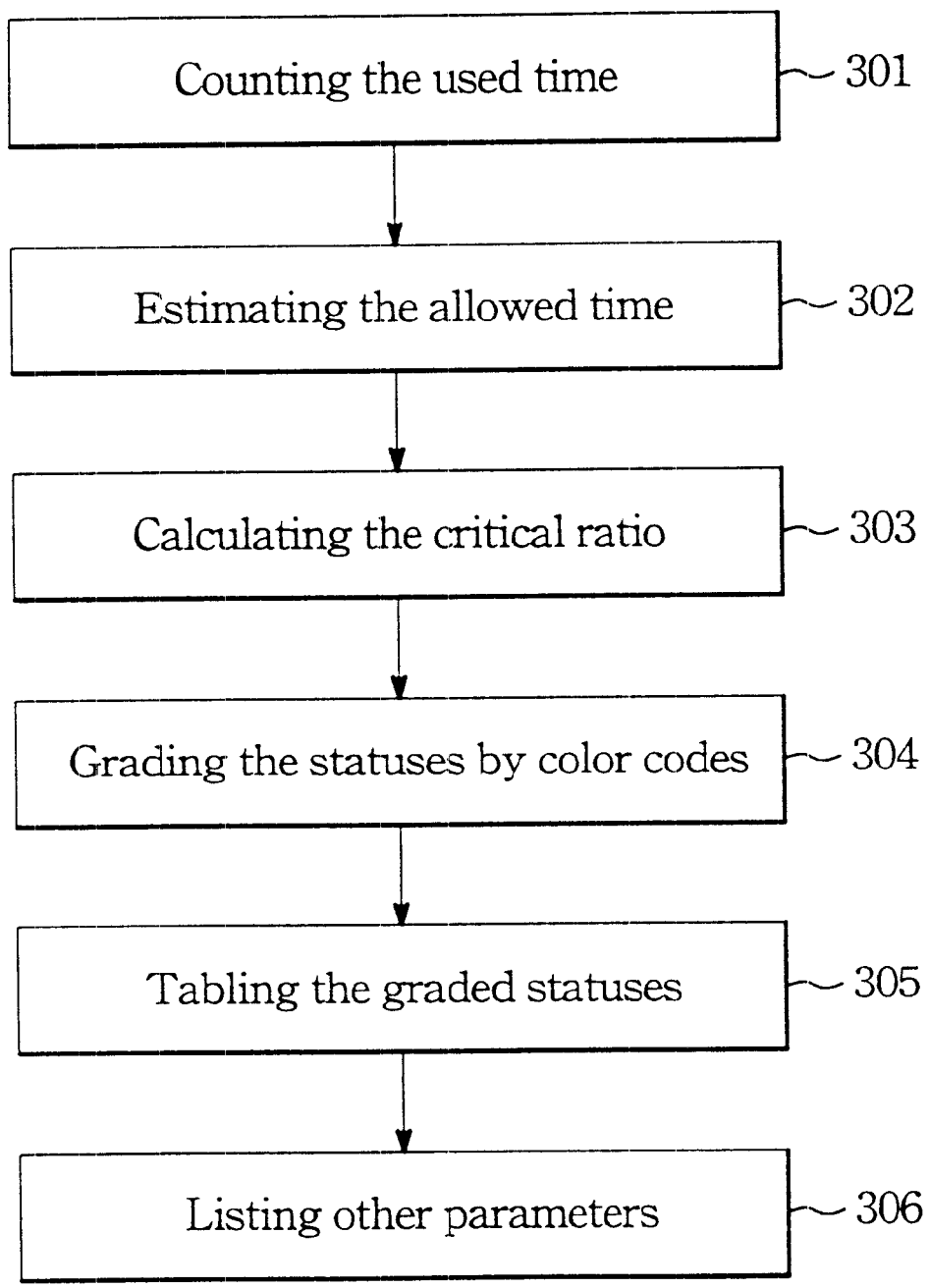
FIG. 3 is a flowchart of the method for monitoring the real-time production operation according to the present invention.

In a heterogeneous production line, different lots of different products will usually be processed at different process stages (or at the same stage if the capacity of the stage is sufficient and the process conditions fit). It could take different periods of time for each lot to complete one process of a stage. Those statuses of different lots at different stages should be differentiated to give the supervisor a further information. FIG. 3 depicts the flow chart of the present invention to monitor the real-time performance for a heterogeneous production line with various product and various processes.

For a lot in the heterogeneous production line to be monitored, the period of time that is already used on the process of the current stage should be first counted and denoted as a used stage time (Step 301). If the lot has already tracked out from a stage, then the used stage time should be the period of time between the time that lot tracked in to that stage and the time tracked out from the previous one. To get a further information, the period of time allowed for this lot to be consumed at the stage should also be estimated and denoted as an allowed stage time (Step 302). The allowed stage time is the period of time that the supervisor expects for the lot to be expended at the stage at most.

The allowed stage time for a lot at a stage should be estimated by a theoretical stage time with stage tolerance. The theoretical stage time is the ideal cycle time that must be taken for this lot to undergo the process of that stage. The theoretical stage time of a lot at a stage could differ from that of another lot at the same stage, for there could be different demands to the same process for different products. Further, the stage tolerances (buffer) of different lots could also be determined differently from each other, either counted by adding a fixed time period or by multiplying a factor larger than unit, depending on how much time left until the due date and how much time the subsequent processes would take.

After the used stage time and the allowed stage time are obtained, a critical-ratio-of-stage (CR-of-stage) of the lot in the current stage at the present time, or in any previous stage, can be calculated (Step 303). The critical-ratio-of-stage can be obtained by the following equation:

CR-of-stage=allowed stage time/used stage time.

According to the critical-ratio-of-stage obtained from this equation, the status of the lot at the stage can be classified into several situations.

As one can be aware from above equation, critical-ratio-of-stage will equal to unit when the used stage time equal to the allowed stage time. That is, when critical-ratio-of-stage is greater than unit, allowed stage time is more than used stage time, and there still is spare time that the process in this stage can utilize. The supervisor can thus concentrate his attention on other process more urgent than the present one. For a previous stage, a critical-ratio-of-stage greater than unit indicates a good efficiency. In the other situation when the critical-ratio-of-stage is less than unit, the used time is more than allowed time. It means that the lot has already been processed at this stage for a period of time more than anticipated. Maybe the supervisor should pay attention to this process stage and try to find the problems and solve them.

If the reported lot has already completed from the process in previous stage and waiting to be processed in the current one, the critical-ratios-of-waiting should be calculated instead of critical-ratios-of-stage (repeat Step 301–303). The critical-ratio-of-waiting (CR-of-waiting) represents the status for a lot in waiting and can be obtained by the following equation:

CR-of-waiting=allowed waiting time/used waiting time.

Here the allowed waiting time is a period of time that the supervisor allows for the lot to wait until the stage process begins. It should be estimated by a theoretical waiting time with waiting tolerance, wherein the theoretical waiting time is a period of time scheduled to be spend for the waiting. The used waiting time is the period of time that is already consumed by the waiting.

In addition to the critical-ratios-of-stage and the critical-ratios-of-waiting, the critical-ratio-of-slack can also be calculated (still repeat Step 301–303). The critical-ratio-of-slack represents the status of the remaining time for a lot until the target-out time. The target-out time is the time that is scheduled to complete all the processes for the lot. In general, the target-out time will be the time of the due day. However, if there are a long-term due date and a short ideal cycle time for total processes, the target-out time of an on-line product should be chosen as the earlier one. It's for the reason not to affect the production of the other lots. The critical-ratio-of-slack (CR-of-slack) can be given by the following equation:

CR-of-slack=allowed slack time/theoretical remaining processing time.

Here the allowed slack time is the period of time from the present until the target-out time, and there would be no tolerance if the due date were chosen to be the target-out time. The theoretical remaining processing time is not a period of time that has already been used, but a period of time that is anticipated for using in all the remaining processes. A tolerance can be taken into consideration when the theoretical remaining processing time is estimated.

Thereafter, for making a further distinction, the statuses of the lot in a stage are graded into several critical degrees according to its critical ratios including CR-of-stage, CR-of-waiting, and CR-of-slack (Step 304). A same number of color codes are used to denote the critical degrees for different ranges of critical ratios. The color code is used to make the eye-catching marks and provide a display much more clearly to the users. In another embodiment, number codes or codes of other types can also be used instead of the color codes.

Different color codes and different critical degrees represent different degrees of urgency. In general, the less the critical ratio is, the more amount of time is consumed and less time left, and the more urgent this lot is. Therefore, a color code represent a critical degree for a range of small critical ratios will tell the supervisor that, the lot in this stage has already consumed much more time than expected. The status of such a lot is more urgent than the one denoted by a color code represent a critical degree with a range of larger critical ratios.

Figure 4:
FIG. 4 is a critical degree report of a four-stage heterogeneous production line according to the present invention.
Figure 4:
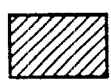
Figure 4:
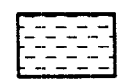
Figure 4:
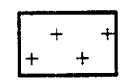
Figure 4:

When the critical degrees and corresponding color codes are decided, a critical degree report of a heterogeneous production line can be tabled to display all the statuses of the stage in this production line (Step 305). FIG. 4 display a embodiment of such a critical degree report of a four-stage heterogeneous production line, wherein every row represents the statuses of a lot, and every column represents the statuses of a stage.

In the preferred embodiment shown in FIG. 4, lots in a production line are graded into five critical degrees with five critical ratio ranges of CR<0.8, 0.8≦CR<0.9, 0.9≦CR<1.0, 1.0≦CR<1.1, and CR≧1.1. Corresponding color codes of red for the first degree of CR<0.8, orange for the second degree of 0.8≦CR<0.9, yellow for the third degree of 0.9≦CR<1.0, green for the fourth degree of 1.0≦CR<1.1, and blue for the fifth degree of CR≧1.1, are also adopted. The numbers in the report represent the WIPs in their current stage. Where is a number of WIP, where are wafers in process. The color code of the current stage represents the critical degree of stage or waiting. The color codes after the current stage represent the critical degree of slack. Moreover, the color codes before the current stage represent the efficiencies achieved at those previous stages and each denoted with the critical degree of stage, that is, the ratio of the allowed stage time to the total time used in that stage. For the reason of display, five symbol 1, 2, 3, 4, 5 are used to represent the five color codes in turn respectively.

As shown in FIG. 4, five products A, B, C, D, E, are managed in this production line. For product A, two lot A1 and A2 are arranged and dispatched. There are 24 wafers of lots A1 processed at stage 3 with the first critical degree of stage indicated by red color code (symbol 1), which means that the lot A1 has been processed at this stage for a period of time much longer than its allowed stage time. However, a fifth critical degree of slack for lot A1 is shown in stage 4 by blue color code (symbol 5), and it means that there still is plenty of time till its target-out time. In this situation, it may be not needed for lot A1 itself to be hurried to finish the process at stage 3, unless considering about the reason not to affect the other lots.

The yellow and orange color codes in stages 1 and 2 tell that the efficiencies of these two stages are achieved such that the ratios of the respective allowed stage times to the total used times for lot A1 are at the ranges corresponding to the third and second degrees. Moreover, in the smaller marked regions at the left ends of stages 3, 2, and 1, it shows that lot A1 has efficiency records indicating the forth, fifth, and second degrees of waiting at these stages. At the current stage 3, the appearance of the number of WIP in the bigger right end indicates lot A1 has already passed through the waiting status of this stage and the process has been started. Alternatively, other symbols or marks can also be used to indicate the waiting status of wafers instead of the smaller marked regions employed in the present report.

Another 24 wafers of lot A2 of product A are arranged at the stage 1 in the third critical degree of waiting and the same critical degree of slack, then, a lot of first or second critical degree should have priority to be considered over these 24 wafers. At the current stage (stage 1), the appearance of the number of WIP in the marked smaller left end tells that the wafers are waiting at this stage for the process. That means, the process of this stage has not started for these 24wafers yet.

As to the product B, there are 22 wafers of lot B1 processed at stage 3 with the fourth critical degree of stage, but a first critical degree of slack for lot B is shown in stage 4. It means that although the process of stage 3 achieves percentage of scheduled progress, the remaining time could be inadequate for the subsequent process of stage 4 to be completed in time. Similar to lot A1, those marked regions at the left side of the WIP number, including stage 2, 1, and the smaller marked region of stage 3, indicate the efficiency records of the lot. Herein, orange color code reminds users the achieved efficiency of the second degree of waiting at stage 1 and the same degree of stage at stage 2. Red color code reminds the first degrees of waiting at stages 2 and 3. Green color code tells that only at the process of stage 1, the achieved efficiency meets the allowed time at the forth degree of stage.

For the 16 wafers of lot C1 of product C, either the critical degree of stage or the critical degree of slack, are in the first degree. Therefore, it is the most urgent lot that the processes must speed up. Product D has 20 wafers of lot D1 processed in stage 4 with the third critical degree of stage, and 18 wafers of lot D2 in stage 1 with the second critical degree of stage. Product E has 12 wafers of lots E1 processed at stage 4 with the third critical degree of stage, and 12 wafers of lot E2 and E3 respectively in stage 3 and 2 with the fifth and second critical degree of waiting. Similarly, symbols at the right sides of WIPs denote the critical-ratios-of-slack, and symbols at the left sides of WIPs tell the efficiency records. For the lot D1, blank of the stage 3 indicates that this lot need not be processed at this stage. With the presentation of the color codes, the critical degrees of the statuses of the production line can be clear at a glance.

When a critical ratio report is established with a table, any other parameters of the lots processed in the production line can also be listed in the report (Step 306), such as the WIPs listed in the last column shown in FIG. 4. In another preferred embodiment, the target-out time is listed. In addition, the due dates, the customers, or another lot characteristics, can also be displayed. Furthermore, the lot statuses such as an urgent dispatch or not, or even a held lot, can be selectively presented by using color codes.

By using the present invention described above, the heterogeneous production lines with various lots and various stages can be efficiently monitored in the real time. All the statuses about the schedule of those lots processed in the production line can be presented. With the critical-ratio-of-stage and the critical-ratio-of-waiting, the statuses of the time consumption at the current and the past stages, either in process or in waiting, are reported. With the critical-ratio-of-slack, the status of the remaining time can be brought into awareness, and an early warning can be received by the users. According to the report which is including above three critical ratios, problems of the production line would appear as soon as, or even before it needs attention, and the supervisors or the users can easily prioritize those problems and react to an abnormal status in real time. In addition, the grading of the critical degree and the color code presentation provides a much more clear display to the users. Furthermore, all the statuses including the critical degrees can be selectively displayed to provide a emphasized impression about specific items or degrees. Therefore, the performance efficiency of the production line may be increased according to the real-time monitor mechanism of the present invention.

As is understood by a person skilled in the art, the foregoing preferred embodiments of the present invention are illustrated of the present invention rather than limiting of the present invention. It is intended to cover various modifications and similar arrangements included within the spirit and scope of the appended claims, such as a critical ratio with the value of the reciprocal of the present one, or the color codes different from the present ones. The scope of such modifications should be accorded the broadest interpretation so as to encompass all such modifications and similar structure.

What is claimed is:

1. A method for monitoring a production line that manages various lots at various stages, said method comprising:

counting a used stage time of a lot already used at a stage of said production line;

estimating an allowed stage time for said lot at said stage, said allowed stage time is a period of time anticipated for said lot to be processed at said stage, wherein said allowed stage time is composed of a theoretical stage time and a stage tolerance time and said theoretical stage time is a ideal cycle time that must be taken of said lot to undergo the process of said stage;

calculating a critical stage ratio of said lot to be a ratio of said allowed stage time to said used stage time; and using said critical stage ratio to represent the stage status of said lot.

2. The method according to claim 1 further comprising a step to establish a table using color code to display said stage status of said lot by using numbers of works in process (WIPs) to indicate the current stage.

3. The method according to claim 1, wherein said stage status of said lot is represented by a number of critical stage degrees graded according to the value of said critical stage ratio.

4. The method according to claim 3, wherein said graded stage status of said lot is denoted by using a number of color codes, and each of said color codes represent one of said critical stage degrees.

5. The method according to claim 1 further comprising the following steps to calculate a critical slack ratio to represent a slack status of said lot:

estimating a theoretical remaining processing time of said lot, said theoretical remaining processing time is composed of an anticipated time of all the processes, from present to the target out, requiring and a slack tolerance time;

counting an allowed slack time for said lot, said allowed slack time is a period of time from the present till a target-out time, wherein said target-out time is a time scheduled to complete all the processes for said lot;

calculating a critical slack ratio of said lot to be a ratio of said allowed slack time to said theoretical remaining processing time; and using said critical slack ratio to represent the slack status of said lot.

6. The method according to claim 5, wherein said target-out time is selected from the group consisting of the due day and the end point of an ideal cycle time of all processes for said lot.

7. The method according to claim 5, wherein said target-out time is selected to be the earlier time between said due day and said end point of said ideal cycle time of all processes for said lot.

8. The method according to claim 5, wherein said slack status of said lot is represented by a number of critical slack degrees graded according to the value of said critical slack ratio.

9. The method according to claim 8, wherein said graded slack status of said lot is denoted by using a number of color codes, and each of said color codes represent one of said critical slack degrees.

10. The method according to claim 1 further comprising the following steps to calculate a critical waiting ratio when said lot is waiting to be processed in said stage, wherein said critical waiting ratio represents a waiting status of said lot:

counting a used waiting time of said lot already used to wait until the process of said stage begins;

estimating an allowed waiting time for said lot at said stage, said allowed waiting time is a period of time allowed for said lot to wait until said process of said stage begins, and wherein said allowed waiting time is composed of a theoretical waiting time and a waiting tolerance time, said theoretical waiting time is a period of time scheduled to be spend on waiting at said stage;

calculating a critical waiting ratio of said lot at said stage to be a ratio of said allowed waiting time to said used waiting time; and using said critical waiting ratio to represent the waiting status of said lot.

11. The method according to claim 10, wherein said waiting status of said lot is represented by a number of critical waiting degrees graded according to the value of said critical waiting ratio.

12. The method according to claim 11, wherein said waiting stage status of said lot is denoted by using a number of color codes, and each of said color codes represent one of said critical waiting degrees.

13. A method for monitoring a production line that manages various lots at various stages, said method comprising:

counting a used stage time of a lot already used at a stage of said production line;

estimating an allowed stage time for said lot at said stage, said allowed stage time is a period of time anticipated for said lot to be processed at said stage, wherein said allowed stage time is composed of a theoretical stage time and a stage tolerance time and said theoretical stage time is a ideal cycle time that must be taken of said lot to undergo the process of said stage;

calculating a critical stage ratio of said lot to be a ratio of said allowed stage time to said used stage time;

counting a used waiting time of said lot when said lot is waiting at said stage to be processed, wherein said used waiting time is a period of time already used to wait until the process of said stage begins;

estimating an allowed waiting time for said lot at said stage when said lot is waiting at said stage to be processed, said allowed waiting time is a period of time allowed for said lot to wait until said process of said stage begins, and wherein said allowed waiting time is composed of a theoretical waiting time and a waiting tolerance time, said theoretical waiting time is a period of time scheduled to be spend on waiting at said stage;

calculating a critical waiting ratio of said lot at said stage when said lot is waiting at said stage to be processed, wherein said critical waiting ratio equals a ratio of said allowed waiting time to said used waiting time;

estimating a theoretical remaining processing time of said lot, said theoretical remaining processing time is composed of an anticipated time for all the processes, from present to the target out, requiring and the slack tolerance time;

counting an allowed slack time for said lot, said allowed slack time is a period of time from the present till a target-out time, wherein said target-out time is a time scheduled to complete all the processes for said lot and selected from the group consisting of the due day and the end point of an ideal cycle time of all processes for said lot; and calculating a critical slack ratio of said lot to be a ratio of said allowed slack time to said theoretical remaining processing time;

representing a stage status, a slack status and a waiting status of said lot with said critical stage ratio, said critical slack ratio and said critical waiting ratio respectively.

14. The method according to claim 13 further comprising a step to establish a table using color code to display said stage status, said slack status and said waiting status of said lot by using numbers of works in process (WIPs) to indicate the current stage.

15. The method according to claim 13, wherein said target-out time is selected to be the earlier time between said due day and said ideal cycle time of all processes for said lot.

16. The method according to claim 13, wherein said stage status, said slack status and said waiting status of said lot are represented by a number of critical degrees graded according to the value of said critical stage ratio, said critical slack ratio and said critical waiting ratio.

17. The method according to claim 16, wherein said graded stage status, said graded slack status and said graded waiting status of said lot is denoted by using a number of color codes, and each of said color codes represent one of said critical degrees.

* * * * *